UNITED STATES PATENT OFFICE.

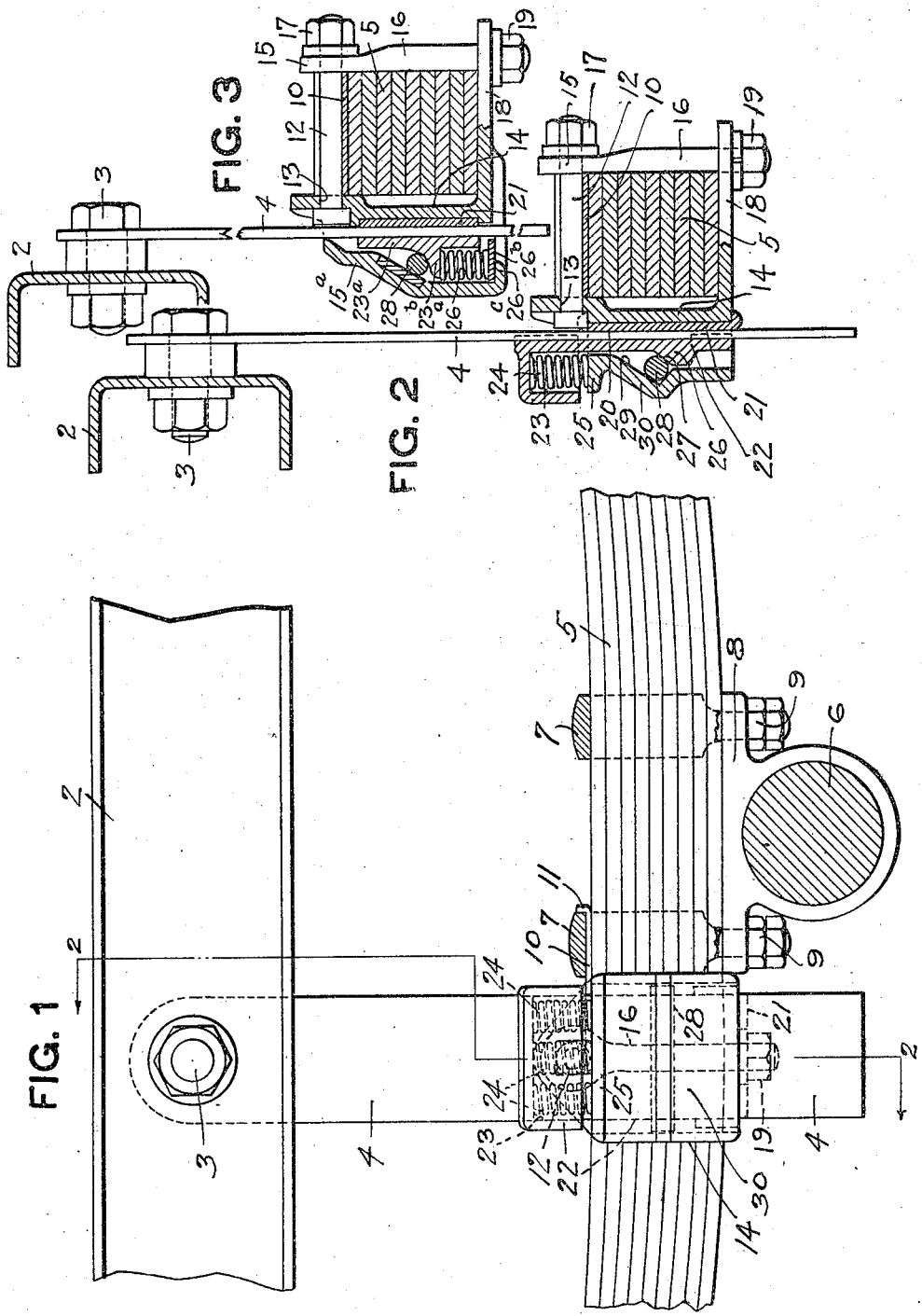

ANDREW CHRISTIANSON, OF BUTLER, PENNSYLVANIA.

SHOCK-ABSORBER.

1,156,665.  Specification of Letters Patent.  Patented Oct. 12, 1915.

Application filed July 14, 1913. Serial No. 778,960.

*To all whom it may concern:*

Be it known that I, ANDREW CHRISTIANSON, a citizen of the United States, and resident of Butler, in the county of Butler and State of Pennsylvania, have invented a new and useful Improvement in Shock-Absorbers; and I do hereby declare the following to be a full, clear, and exact description thereof.

My invention relates to a shock absorber for automobiles or other vehicles.

The object of my invention is to provide a simple form of shock absorber in which very little, if any, resistance is offered to the downward movement of the vehicle springs and body, but on the recoil sufficient resistance is offered to cause the springs and body of the vehicle to rise gradually and so obviate the annoyance due to the jolt and jar of the vehicle when a rough road is encountered.

To these ends my invention comprises, generally stated, a member secured to the vehicle body, a second member supported by the axle, said first member passing down between a stationary friction face and a movable friction plate on said second member, said frictional plate adapted to yield downwardly upon the downward movement of said first member, and means for increasing the friction on said first member held between said movable friction plate and said stationary friction face due to the rebound, so that when said first member is lowered, it moves between said frictional members without much resistance but upon the recoil the friction is increased and its upward movement retarded, so as to take up the sudden recoil and permit of the gradual rising of the said member to absorb the shock to the body of the vehicle.

In the accompanying drawing, Figure 1 is a face view of my improved shock absorber, only a portion of the body of the vehicle being illustrated and a portion of the spring; Fig. 2 is a section on the line 2—2 Fig. 1; and Fig. 3 is a modified form of my invention.

In the drawing, the numeral 2 designates a portion of the body or chassis of the automobile or other vehicle, and secured to said body portion by means of the bolt 3 is the member 4 which in the case illustrated is in the form of a plate or bar extending downwardly from said body portion.

The spring 5 is an ordinary leaf spring supported by the axle 6, the clips 7 being connected to the bracket 8 by nuts 9. A check plate 10 is interposed between the clips 7 and the top leaf of the spring 5, said check plate having the up-turned flange 11 engaging said clip and its opposite end curved upwardly to engage the bolt 12. The bolt 12 passes through the opening 13 in the member 14 and the opposite end of said bolt passes through an opening in the flattened end portion 15 of the bolt 16. A nut 17 is secured to the bolt 12. A bolt 16 passes up through the lower plate 18 of the member 14 and a nut 19 is secured to said bolt. In this manner the member 14 is secured to the spring 5 and as the axle supports said spring, said member 14 is indirectly supported by the axle.

The member 4 passes down through the passage 20 in the member 14, and one side of said member 4 is in frictional contact with the stationary friction plate 21 which is of hardened steel and secured to the member 14, which may be made in the form of a casing. The opposite side of the member 4 is in frictional contact with the movable friction member 22. This friction member 22 has the recess 23 to receive the springs 24 which is interposed between the inner face of said recess and the lug 25 on the member 14. The tendency of the springs 24 is to force the movable friction member 22 upwardly. The friction member 22 has the lug 26 with the inclined face 27 and a roller pawl or detent 28 is interposed between the inclined face 27 on said lug and the inclined face 29 on the inner face of the front plate 30 of the member 14.

When my improved shock absorber is in operation, and a rough place in the roadway is encountered, the vehicle body will be lowered and with it the plate or member 4. The plate 4 moves down between the stationary friction plate 21 and the movable friction member 22, and its downward movement is not materially retarded as the movable plate 22 yields downwardly by the compression of the springs 24. When, however, the recoil takes place due to the reaction of the springs 5, resistance to the upward movement of the plate 4 and the vehicle body is offered by the action of the movable friction plate 22, which is forced upwardly by the springs 24 and the roller detent 28 is wedged between the lug 26 and the inclined face 29 of the member 14. In this manner the recoil is dampened and the sudden jolt or jar due to the recoil is avoided and the occupants of the car ride with greater comfort.

In Fig. 3 I have shown a modified form of my invention, and in this case the movable frictional plate 23ª has the shoulder 23ᵇ with which the springs 26ª engage, said springs being interposed between said shoulder and plate 26ᵇ on the inturned end 26ᶜ of the member 15ª.

What I claim is:

1. In a shock absorber for vehicles, the combination of a member secured to the vehicle body, a second member supported by the axle, said second member having a friction face, and a movable friction plate therein between which said first member passes, a spiral spring parallel with said movable friction plate and interposed between a shoulder formed on said movable friction plate and said second member normally forcing said friction plate upwardly, and a roller pawl interposed between said movable friction plate and said second member.

2. In a shock absorber for vehicles, the combination of a member secured to the vehicle body, a second member supported by the axle, said second member having a friction face and a movable friction plate therein between which said first member passes, a spring interposed between the upper end of said movable friction plate and said second member, and a roller pawl interposed between said movable friction plate and said second member.

3. In a shock absorber for vehicles, the combination of a member secured to the vehicle body, a second member supported by the axle, said second member having a stationary friction face and a movable friction plate in said second member between which said first member passes, an overhanging portion at the upper end of said movable plate, a spring interposed between said overhanging portion and said second member, and a roller pawl interposed between said movable friction plate and said second member.

4. In a shock absorber for vehicles, the combination of a member secured to the vehicle body, a second member supported by the axle having a stationary friction face, a movable friction plate in said second member between which and said stationary friction face said first member passes, a hood at the upper end of said movable friction plate, a spring in said hood and bearing against said second member and a roller pawl interposed between said movable friction plate and said second member.

In testimony whereof, I the said ANDREW CHRISTIANSON have hereunto set my hand.

ANDREW CHRISTIANSON.

Witnesses:
ROBERT C. TOTTEN,
JOHN F. WILL.